Figure 4:
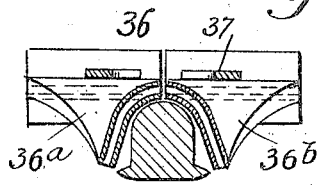

J. T. LISTER.
TIRE FORMING APPARATUS.
APPLICATION FILED JULY 12, 1913.

1,190,433.

Patented July 11, 1916.
2 SHEETS—SHEET 1.

Witnesses.
E. B. Gilchrist
L. L. Porter

Inventor
John T. Lister
by Thurston & Kwis
Attys.

J. T. LISTER.
TIRE FORMING APPARATUS.
APPLICATION FILED JULY 12, 1913.

1,190,433.

Patented July 11, 1916.
2 SHEETS—SHEET 2.

Inventor
John T. Lister
by Thurston & Kwis
Attys.

Witnesses
E. B. Gilchrist
L. I. Porter

UNITED STATES PATENT OFFICE.

JOHN T. LISTER, OF CLEVELAND, OHIO.

TIRE-FORMING APPARATUS.

1,190,433.   Specification of Letters Patent.   Patented July 11, 1916.

Application filed July 12, 1913. Serial No. 778,636.

*To all whom it may concern:*

Be it known that I, JOHN T. LISTER, a citizen of the United States, residing at Cleveland, in the county of Cuyahoga and State of Ohio, have invented a certain new and useful Improvement in Tire-Forming Apparatus, of which the following is a full, clear, and exact description.

This invention relates to tire forming apparatus and is an improvement over the apparatus forming the subject matter of my prior application Serial No. 760,896, filed April 14th, 1913.

In the machine constructed in accordance with my prior invention, and forming the subject matter of the application just referred to, there is provided a frame carrying a plurality of,—preferably four,—collapsible cores, on which is adapted to be wound tire forming material which is fed from different sources of supply suitably located in line with the cores when in the four tire forming positions. A set of compressors is arranged at each tire forming position and coöperates with the cores, each set being adapted to compress and shape on a core the material which forms a particular part of the tire or the material which is utilized in one stage of the process of forming a complete tire. The whole is so arranged that while the initial or inner layers for one tire are wound and compressed on one core, the material forming the next or outer part of the second tire is wound or compressed on the next adjacent core. By the intermittent rotation of the frame, the different cores can be successively brought to different positions in proper relationship with respect to the sources of supply, and with respect to the compressors corresponding to the different positions, so that a plurality of tires are progressively constructed. As each core passes from the last to the first or initial position, the material forming the inner or foundation part of a tire is again wound on that core.

The present invention relates to certain improvements in the machine above briefly described, the object being to provide certain improvements which increase the efficiency and speed of the machine.

More specifically, the present invention relates to certain improvements in the means for supporting the cores on the frame; to the means for driving or rotating the cores and the compressors, and to a guiding and shaping means which is utilized in connection with each core to cause the material to conform substantially to the shape or contour of the core, as the material is wound on the core, and is about to pass beneath the first compressors, and to prevent it from sagging and adhering at the wrong point to the core or previously wound layers.

My invention may be further briefly summarized as consisting in certain novel details of construction and combinations and arrangements of parts which will be described in the specification and set forth in the appended claims.

Figure 1:
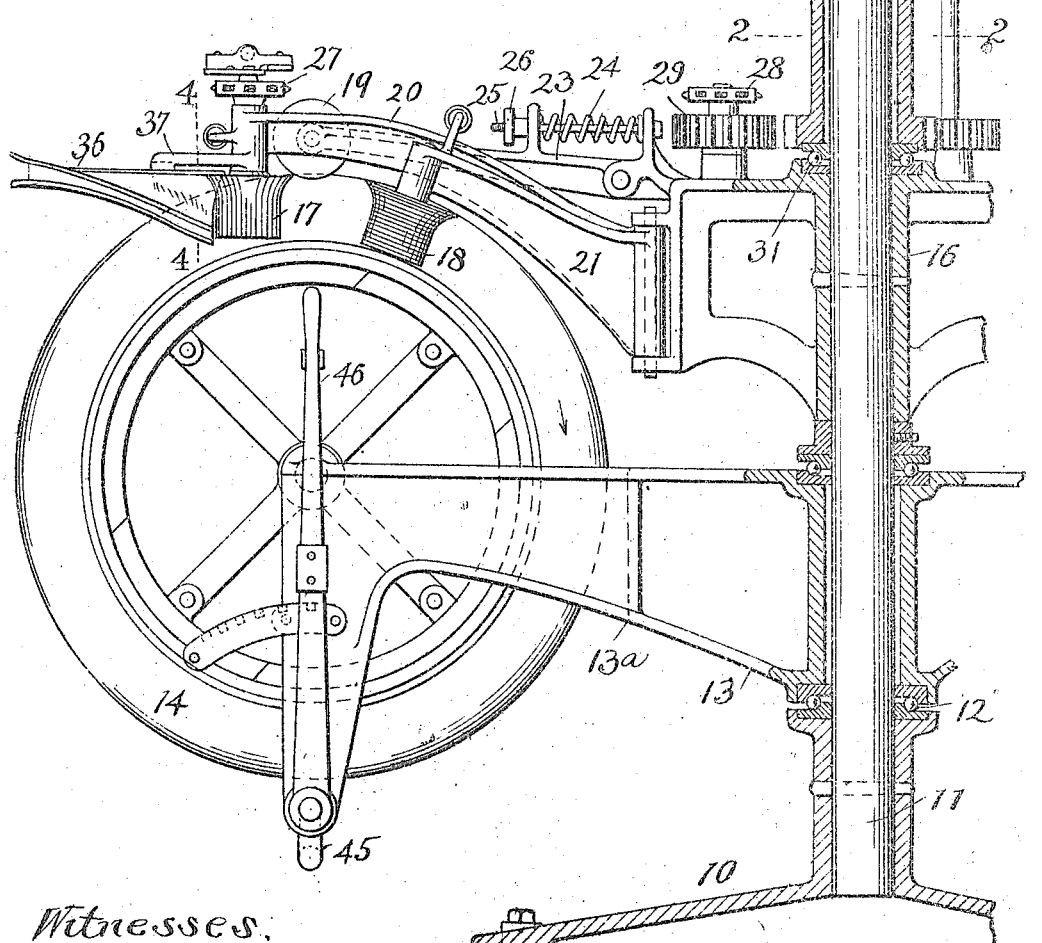
Figure 2:
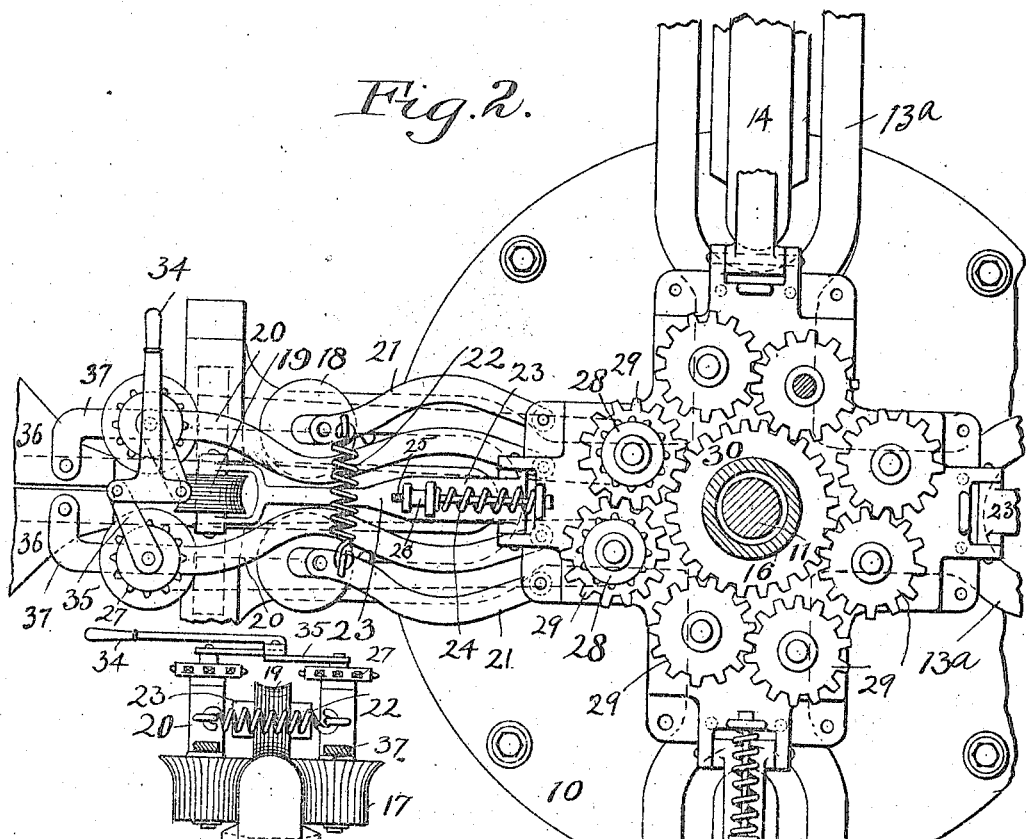
Figure 3:
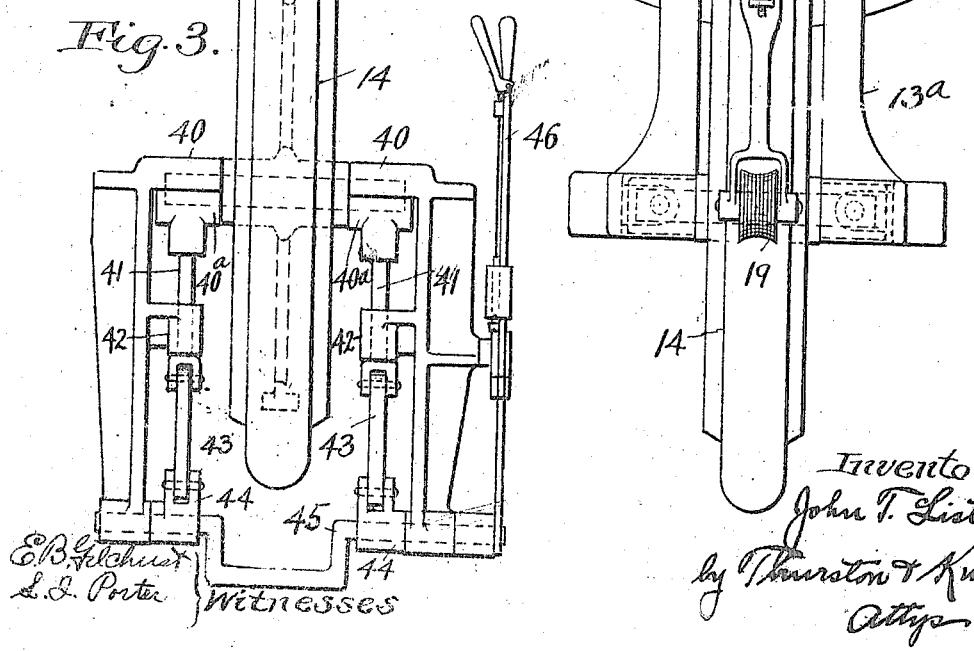

In the accompanying sheet of drawings, wherein I have shown the preferred embodiment of my invention, Figure 1 is a side elevation, with parts in vertical section, of a portion of the machine; Fig. 2 is a top plan view of a portion of the machine, with parts in horizontal section substantially along the line 2—2 of Fig. 1; Fig. 3 is an end view, looking toward one of the cores, and mechanism associated therewith; and Fig. 4 is a transverse sectional view substantially along the line 4—4 of Fig. 1, looking in the direction indicated by the arrow.

Referring now to the drawings, it will be seen that the machine includes a suitable base 10 which supports a stationary vertical shaft or post 11. Suitably supported on roller bearings 12, in turn supported by the base and shaft 11, is a frame 13 having four outwardly projecting arms 13ª, in the outer portion of each of which is supported a collapsible core 14 on which tires are adapted to be formed. In Fig. 1, one of these outstanding core supporting arms is shown,—the four arms being arranged 90° apart, as indicated in Fig. 2.

As fully described in my prior application, the material is adapted to be fed onto the cores simultaneously from four different sources of supply, such as reels, and as a portion of the tire is formed with the cores in one winding position, the frame is rotated so as to advance each of the cores to the next position, so that the tire is progressively built, and when the core passes through the four tire forming positions, the tire is completed, as far as work done on the tire forming machine is concerned. I have not considered it necessary to show the reels which supply the tire forming material to the cores, as they form no part of the present invention, and as the same are shown in my prior application.

Supported by the shaft 11, above the rotary core supporting frame 13 is a relatively fixed frame 16 carrying a plurality of sets of rotary compressors and compressor supporting arms. There are four sets of compressors, or one corresponding to each winding position, and the different sets will be shaped to substantially conform to that portion of the tire which is formed at the particular winding position at which the set of compressors is located.

It will be observed by reference to Figs. 1 and 2, that each set of compressors includes a forward pair 17, and a rearward pair 18 which engage the side portions of the core, or partially completed tire, and a compressor 19 which engages the top of the partially completed tire. The forward pair of compressors 17 are secured to driving spindles rotatively supported by a pair of arms 20 which extend from the compressors inwardly to and are pivotally connected by vertical pins to the frame 16, so that the said arms and the compressors carried thereby may be swung inwardly from or toward the core which is between the compressors. Likewise the rearward pair of compressors 18 are supported on spindles carried by a pair of arms 21 which extend inwardly along the outer sides of the arms 20, and are likewise pivotally connected to the frame 16 so as to swing in the same manner that the arms 20 may swing.

The arms 21 are connected together by a coil spring 22 which pulls the compressors 18 inwardly toward and onto the core, or partially completed tire. These arms 21 have inwardly extending lugs which engage the inner pair of arms 20, so that these arms and the compressors 17 carried thereby are likewise drawn inwardly by the same spring 22, and the compressors 17, as well as the compressors 18, are yieldingly pressed against the side portions of the core or partially completed tire.

The compressor 19 which engages the top part of the core or partially completed tire is carried by an arm 23 which is pivoted to the frame so that it may swing vertically, and the arm 23 and compressor 19 are yieldingly pressed downward by a compression spring 24, arranged between an abutment on the arm and a corresponding abutment on the frame and surrounding a bolt 25 which is provided at its outer end with a stop nut 26.

In my prior application, the cores are positively driven, and in turn drive the compressors, but in the present case, the forward pair of compressors 17 of each set are positively driven and rotate the core which is between them. It will be observed that the spindles supporting the compressors 17 are provided at their upper ends with horizontally disposed sprocket wheels 27 which are adapted to be connected by suitable sprocket chains (which for the sake of clearness are not shown) to corresponding horizontally disposed sprocket wheels 28, mounted on spindles supported by the frame 16. Secured to and rotating with the rear sprocket wheels 28 are a pair of intermeshing gears 29, one of which engages a larger gear 30 rotatably supported by suitable bearings 31 carried by the shaft 11 and stationary frame 16, above the latter.

By reference to Fig. 2, it will be seen that the central gear 30 drives the four pairs of gears 29 utilized with the four sets of compressors, and that by the arrangement shown, the two outer compressors of each set will be simultaneously rotated in opposite directions. The central driving gear 30 is driven by a vertical shaft 33 which is connected to one of the gears 29 as shown in Figs. 1 and 2, and this shaft 33 which extends upwardly to the top of the central stationary shaft 11 may be driven in any suitable manner.

Preferably the compressors 17 which cooperate with the other compressors to press, shape and smooth the tire forming material on the core, and which also drive the core, are corrugated vertically, as shown in Figs. 1 and 3, so that there will be good driving engagement between the said compressors and the tire forming material. The remaining compressors 18 and 19 are preferably formed of separate sections which may rotate relative to each other, as shown conventionally in this application, and in detail in my prior application, so that there will be a true rolling action, and little slippage between the compressors and the material which they engage.

The compressors 17 and 18 and the pivoted or swinging arms supporting the same may be spread apart for a purpose to be referred to presently, by spreading mechanism, including a lever 34 having a T-shaped portion, the ends of which are connected by links 35 to the ends of the spindles supporting the compressors 17 and sprocket wheels 27.

Another important feature of my invention consists in providing in connection with each set of compressors a guide and shaper 36, through which the tire forming strip or material passes just before it reaches the core, and passes beneath the forward set of compressors. In the present case, the guide is composed of, or is divided into two similar parts 36$^a$ and 36$^b$, as shown in Figs. 1, 2 and 4, said parts being supported adjacent each other, by arms 37 projecting outwardly from the compressor supporting arms 20 immediately in front of the compressors 17. Each part of the guide 36 includes a pair of plates which are spaced apart, and between which the material is adapted to pass as it is fed onto the core, and the guide as a whole when the two parts thereof are in guiding position, as shown in the drawings, is substantially flat at its outer end, and is gradually curved from its outer end to its inner end, so that at its inner or outlet end just in advance of the compressors 17, said guide conforms substantially to the shape or cross sectional contour of the core, and is quite close to the latter. The result is that when the tire forming strip is wound onto the core, just before it reaches the core, it is in substantially the shape that it assumes when it is on the core, and it is so guided and shaped previous to its application to the core that the compressors smooth and compress the strip without any material wrinkling or creasing. This guide therefore does away with the liability of the material, which is very strongly adhesive, improperly contacting and sticking onto the material previously wound on the core, and does away with the necessity of frequently pulling or ripping sections of the strips from the core, as is often required with tire forming machines in use at the present time, especially machines of the hand operated type.

It will be understood that the plates forming the guide are suitably spaced and held apart so that the tire forming strips may feed freely through or between the same, but nevertheless a strip is so shaped as it passes between the plates, that it will conform substantially to the shape of the core, when it emerges from the inner end of the guide, and passes between the compressors and the core.

When the material has been wound from the different sources of supply onto the four cores, and is compressed on the latter, and when the portions of the tires on the cores corresponding to the four winding positions have been completed, the compressors will be spread apart by manipulating the hand levers 34, and thence, the frame and the cores will be turned relatively to the compressors, so that each core will be advanced one step. In order that the frame and cores may be turned readily, I provide means whereby the several cores may be lowered beneath the compressors which normally engage the sides of the cores. It will be observed by reference to Figs. 1 and 3, that the core is supported by bearings 40, the lower halves 40ª of which are separable from and can at will be lowered from the upper halves of the bearings. The bearing parts 40ª are in this case carried by vertically movable arms 41 which are guided for vertical movement in lugs or bosses 42, carried by the core supporting part 13ª of the frame 13. The lower ends of the arms 41 are pivotally connected to the upper ends of links 43, which at their lower ends are pivotally connected to members 44 secured to a shaft 45 supported for rotary movement in the lower end of the portion of the frame supporting the core. This shaft has secured to one end a lever 46, which can be rocked to rotate the shaft 45, and to raise and lower the core.

When it is desired to rotate the frame and the four cores supported thereby, each of the cores will be lowered beneath the compressors, so that the latter will not obstruct the swinging or rotary movement of the cores. After the cores are properly positioned circumferentially, after being advanced by the rotation of the frame, they can be elevated or moved upwardly between the side compressors, after which the latter can be swung inwardly so that the compressors will engage the core, and be in position to compress tire forming material wound thereon.

Having thus described my invention, what I claim is:

1. In a tire forming machine, a frame, a core supported thereby and adapted to have wound thereon tire forming material, rotary compressors coöperating with the sides and top of the core to compress the material wound thereon, and means for positively rotating certain of the side compressors so that the latter will rotate the core by their engagement therewith, said core being supported independently of the compressors.

2. In a tire forming machine, a frame, a rotary core supported thereby, a plurality of pairs of rotary compressors coöperating with the core and arranged on opposite sides of the same so as to compress material wound on the core, and means for positively driving a part of the compressors so that the latter may rotate the core, as well as compress material wound on the latter, said core being supported independently of the compressors.

3. In a tire forming machine, a frame, a rotary core supported thereby and adapted to have tire forming strips wound thereon, a guide and shaper for the material arranged adjacent the point at which the strip passes onto the core, said guide having its outer end substantially flat, and its inner end curved substantially in conformity with the curvature of the core and being composed of upper and lower parts between which the material passes.

4. In a tire forming machine, rotary core compressors adapted to shape material on the core, a rotary support for the core permitting the core to be swung laterally with respect to the compressors, and means for raising and lowering the core relative to the compressors.

5. In a tire forming machine, a support, a frame supported thereby for rotary movement about a substantially vertical axis, a core supported by the frame for rotary movement about a substantially horizontal axis, compressors supported in proximity to the core and independently thereof, and on opposite sides of the latter, and means for raising the core upwardly between the compressors and for lowering the same beneath the compressors.

6. In a tire forming machine, a frame, a rotary core supported thereby and adapted to have tire forming material wound thereon, a guide for the material arranged adjacent the core and composed of two movable sections, and a pair of movable supports for said sections.

7. In a tire forming machine, a frame, a rotary core supported thereby and adapted to have tire forming material wound thereon, a guide for the material arranged adjacent the core, a pair of compressors adapted to engage opposite sides of the core, and movable supports for said compressors, the guide being formed in two sections one carried by one of said supports and the other by the other of said supports.

In testimony whereof I hereunto affix my signature in the presence of two witnesses.

JOHN T. LISTER.

Witnesses:
L. I. PORTER,
A. F. KWIS.